Jan. 12, 1971     A. A. CARROLL ET AL     3,554,567

FLUID SEAL

Filed March 16, 1966

INVENTORS.
ALEXANDER A. CARROLL.
LEONARD P. DAMRATOWSKI.
BY Raymond Curtin

ATTORNEY.

ns Patent Office 3,554,567
Patented Jan. 12, 1971

3,554,567
FLUID SEAL
Alexander A. Carroll, Greensburg, and Leonard P. Damratowski, Monroeville, Pa., assignors to Carrier Corporation, Syracuse, N.Y., a corporation of Delaware
Filed Mar. 16, 1966, Ser. No. 534,692
Int. Cl. F16j 15/12
U.S. Cl. 277—164                    2 Claims

ABSTRACT OF THE DISCLOSURE

A high pressure seal having a cross section of generally arcuate shape with a narrowed central section. The seal is adapted for deformation in the narrowed central section by the structure to be sealed to deflect the top portion of the seal toward the high pressure side of the structure so that fluid pressure acting against the seal wedges the seal against the surfaces of the structure employing the seal.

This invention relates to a novel seal construction. More particularly, this invention relates to an improved fluid seal for use between mating surfaces. Still more particularly, this invention relates to a seal for applications where there is a variable pressure on the seal, or stated another way, there is a pressure difference across the seal.

The conventional O-ring seal which is used extensively for sealing mating surfaces ordinarily provides adequate sealing therebetween. However, when subjected to high pressures, O-rings have a tendency to extrude unless the mating surfaces and the O-ring grooves are held to extremely close tolerances.

It is, therefore, an object of this invention to provide an improved high pressure seal. It is a further object of this invention to provide a seal for use between mating surfaces wherein the mating surfaces do not require extremely close tolerances. It is a still further object of this invention to provide a seal which will operate under variable pressures. Another object of our invention is the provision of a sealing device which accommodates itself for variations in the expansion and contraction of the mating parts resulting from temperature and pressure changes.

These objects are attained by providing a groove in one of the mating surfaces to be sealed. A seal having a relatively narrow cross-section in the direction parallel to the plane of the mating surfaces and a relatively large cross-section in a direction perpendicular to the plane of the mating surfaces is disposed in the aforementioned groove. The seal has a slight curvature in the cross-section which is generally perpendicular to the mating surfaces so that the seal is bent in a direction toward the pressure side of the mating parts. Thus, when high pressure fluid exerts a force on the seal, it causes the seal to wedge itself more firmly between the mating parts preventing any leakage therebetween.

Other objects and features of our invention will be apparent upon a consideration of the ensuing specification and drawing in which.

Figure 1:
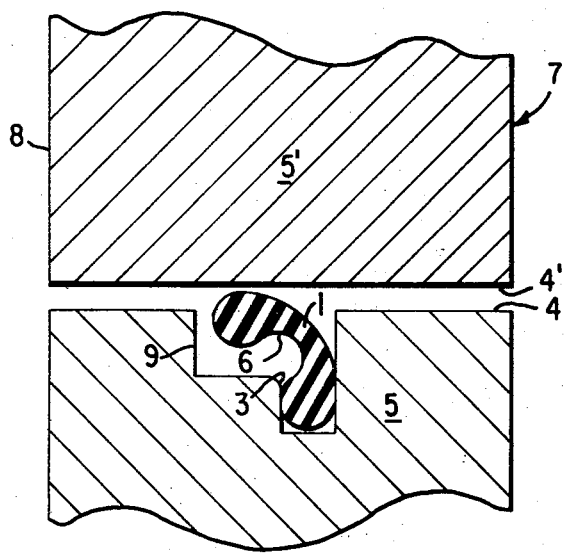
FIG. 1 is a partial cross-sectional view through a typical unassembled joint embodying the seal of the present invention.
Figure 2:
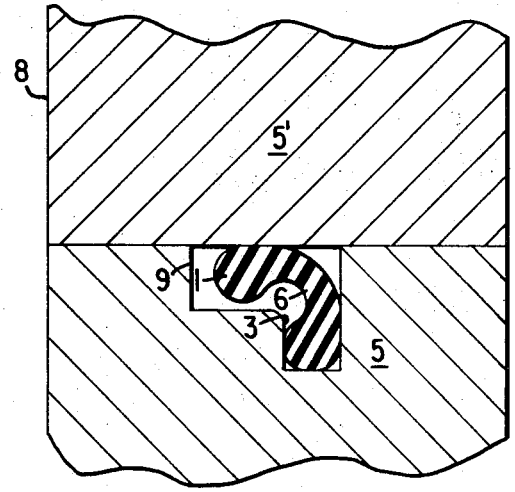
FIG. 2 is a partial cross-sectional view through a typical assembled joint embodying the seal of the present invention.

Referring more particularly to FIGS. 1 and 2, there is shown a resilient sealing member 1 adapted to be positioned in a groove 3 in the surface 4 on one part 5 of a fluid handling structure 7. The fluid handling structure 7 could be a valve, fluid container, compressor casing, or any other conceivable structure having opposed surfaces subjected to fluid pressures and may be of the segmented type. The part 5 together with the part 5' may form lower and upper halves respectively of a housing or a partition defining separate chambers. A relief portion 9 of the groove 3 is formed on the side of groove 3 closest the pressure side 8 of the fluid handling structure 7. The sealing member 1 is formed of an elastomer suitable for the particular seal application. The seal is formed so as to be coextensive with the shape of the fluid handling structure. The seal has a cross section with a relatively long dimension in a direction perpendicular to the plane of the mating surfaces and a relatively short dimension in a direction parallel to the plane of the mating surfaces. The relative widths of the groove 3 and the sealing member 1 are such that the seal is press-fitted in the groove. The cross-section of the seal is generally arcuate as can be seen in the drawing. The seal has a central portion 6 of reduced width to insure deformation of the seal in the central position. The dimension of the seal perpendicular to the plane of the mating surfaces is great enough to cause the seal to bend at the central portion thereof so that the top of the seal is deflected toward the pressure side 8 of the fluid handling structure, into the relief 9 as illustrated in FIG. 2 where the mating parts of the fluid handling structure 7 are shown assembled. Referring to FIG. 2, it can be seen that high pressure fluid from pressure side 8 acting against fluid seal 1 forces the seal against the surface 4' and wedges the seal firmly between the mating surfaces of the fluid handling structure 7, providing a joint wherein the sealing ability of the seal increases as the fluid pressure increases. As can be seen, the novel cross-sectional shape of the seal prevents the seal from assuming a straight cross-section perpendicular to the plane of the mating surfaces 4 and 4' and prevents extrusion of the seal.

Figure 3:
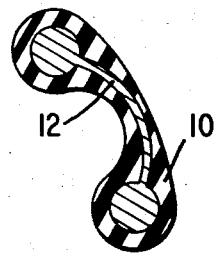
FIG. 3 is a cross-sectional view of a seal illustrating a second embodiment of our invention.

The embodiment of our invention illustrated in FIG. 3 is a modification of the seal illustrated in FIGS. 1 and 2 for use where there are extreme pressure variations within a fluid handling structure. The seal 10 of FIG. 3 has a member 12 therein of a material such as spring steel to exert a continuous force on the seal 10 tending to force the seal into a straightened position and provide sufficient stiffness to the seal to prevent extrusion thereof. The size and strength of the member 12 may be varied for each application of the seal to provide a sealing member having optimum sealing characteristics for the particular application. In a structure subject to large pressure variations, at low pressure the member 12 will hold the seal 10 tightly against the mating surfaces to prevent fluid leakage therebetween. As the pressure increases, the seal will be subject to the wedging action described in the explanation of FIGS. 1 and 2 above. Thus, the seal 10 will provide proper sealing between mating surfaces of a fluid handling structure under conditions of both high and low fluid pressures.

While we have described a preferred embodiment of our invention, it is to be understood that the invention is not limited thereto since it may be otherwise embodied within the scope of the following claims.

We claim:

1. In a fluid handling device including a joint defined by first and second planar mating surfaces formed on adjacent structural parts, the first mating surface having a groove therein with a portion serving as a relief, a resilient sealing member having a relatively narrow width, said sealing member being slightly arcuate in cross-section and of substantial dimension compared to its width in the direction of its arc, said seal having a narrow central section with generally circular ends, one of said circular ends being adapted for seating engagement in the groove of the first mating surface, the second mating surface forcing the other, generally circular end of said sealing member into the space defined by the relief and in space relation to the walls thereof so that fluid under pressure collected in the relief will urge the other end of said sealing member upwardly into intimate sealing relation with the second mating surface and will urge the narrow central section sidewardly against the side of said groove.

2. A seal according to claim 1 further including a flexible, spring type member disposed within the sealing member, said spring member assisting pressure fluid in the relief in urging said sealing member against the second mating surface and the side of said groove.

References Cited

UNITED STATES PATENTS

| | | | |
|---|---|---|---|
| 508,448 | 11/1893 | Terlinden | 285—99 |
| 653,143 | 7/1900 | Martin | 285—99X |
| 2,098,084 | 11/1937 | Carlson | 277—94 |
| 2,231,947 | 2/1941 | Rich | 277—94 |
| 2,590,288 | 3/1952 | Breyfogle et al. | 277—95UX |
| 2,733,567 | 2/1956 | Zellweger | 277—95X |
| 2,950,130 | 8/1960 | Schneider | 285—99X |
| 3,217,922 | 11/1965 | Glasgow | 277—206X |
| 3,313,552 | 4/1967 | McElya et al. | 277—95 |

FOREIGN PATENTS

| | | | |
|---|---|---|---|
| 1,120,663 | 7/1956 | France | 277—205 |

LAVERNE D. GEIGER, Primary Examiner

J. S. MEDNICK, Assistant Examiner

U.S. Cl. X.R.

277—200, 206, 235; 285—349